United States Patent
Fu

(10) Patent No.: US 8,335,819 B2
(45) Date of Patent: Dec. 18, 2012

(54) METHOD AND APPARATUS FOR PROVIDING CLIENT-SIDE CACHING

(75) Inventor: Yan Fu, Espoo (FI)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 12/651,089

(22) Filed: Dec. 31, 2009

(65) Prior Publication Data

US 2011/0161403 A1 Jun. 30, 2011

(51) Int. Cl.
*G06F 15/16* (2006.01)
(52) U.S. Cl. .......................... 709/203; 709/225; 709/226
(58) Field of Classification Search .................. 709/203, 709/225, 226
See application file for complete search history.

(56) References Cited

U.S. PATENT DOCUMENTS

| | | | |
|---|---|---|---|
| 6,247,050 B1 * | 6/2001 | Tso et al. ...................... | 709/224 |
| 6,748,386 B1 * | 6/2004 | Li .................................... | 1/1 |
| 6,836,774 B2 * | 12/2004 | Melbin ......................... | 709/217 |
| 6,910,066 B1 | 6/2005 | Pohl | |
| 7,035,907 B1 * | 4/2006 | Decasper et al. ............. | 709/212 |
| 7,343,398 B1 * | 3/2008 | Lownsbrough ............... | 709/218 |
| 7,395,275 B1 * | 7/2008 | Parent et al. .................. | 1/1 |
| 7,441,011 B2 | 10/2008 | Lin et al. | |
| 7,467,389 B2 | 12/2008 | Mukkamala et al. | |
| 7,657,595 B2 * | 2/2010 | Agarwalla et al. ............ | 709/203 |
| 7,685,298 B2 * | 3/2010 | Day et al. ...................... | 709/229 |
| 8,065,275 B2 * | 11/2011 | Eriksen et al. ................ | 707/661 |
| 8,078,759 B2 * | 12/2011 | Seifert et al. .................. | 709/246 |
| 2002/0138555 A1 * | 9/2002 | Yu .................................. | 709/203 |
| 2003/0229718 A1 * | 12/2003 | Tock et al. .................... | 709/246 |
| 2004/0010629 A1 * | 1/2004 | Diesel et al. .................. | 709/250 |
| 2004/0014013 A1 * | 1/2004 | Diesel et al. .................. | 434/118 |
| 2004/0243852 A1 * | 12/2004 | Rosenstein .................... | 713/201 |
| 2005/0050067 A1 | 3/2005 | Sollicito et al. | |
| 2006/0010173 A1 | 1/2006 | Kilday et al. | |

(Continued)

FOREIGN PATENT DOCUMENTS

EP 1 318 461 A1 6/2003

(Continued)

OTHER PUBLICATIONS

HTTP cookie. Accessed: Mar. 31, 2010, http://en.wikipedia.org/wiki/HTTP_cookie.

(Continued)

*Primary Examiner* — Backhean Tiv
(74) *Attorney, Agent, or Firm* — Ditthavong Mori & Steiner, P.C.

(57) ABSTRACT

An approach is provided for providing client-side caching in network communication. A client-side caching module receives a request, from a device, for a scripting file associated with web content, the scripting file supporting client-side caching at the device. The client-side caching module identifies that the request is received over a connection supporting connection reuse. The client-side caching module determines whether the request is a first-time request. If the request is a first time request, the client-side consistency module collects session configuration information for the web content from the device, specifies session variables in the scripting file based on the session configuration information, and initiates a subsequent request for the scripting file over the connection. If the request is a subsequent request, the client-side caching module marks the session variables in the scripting file as cacheable at the device, and causes, at least in part, transmission of the scripting file to the device.

20 Claims, 10 Drawing Sheets

U.S. PATENT DOCUMENTS

| | | | |
|---|---|---|---|
| 2006/0031751 A1 | 2/2006 | Ehud | |
| 2006/0106807 A1* | 5/2006 | DeVitis et al. | 707/10 |
| 2007/0074124 A1* | 3/2007 | Farn | 715/760 |
| 2007/0299928 A1 | 12/2007 | Kohli et al. | |
| 2008/0082832 A1 | 4/2008 | McDougal et al. | |
| 2009/0083442 A1* | 3/2009 | Sutter et al. | 709/248 |
| 2009/0217301 A1* | 8/2009 | Grant et al. | 719/320 |
| 2010/0049795 A1* | 2/2010 | Tock et al. | 709/203 |
| 2010/0174774 A1* | 7/2010 | Kern et al. | 709/203 |
| 2011/0154464 A1* | 6/2011 | Agarwal et al. | 726/8 |

FOREIGN PATENT DOCUMENTS

| | | |
|---|---|---|
| JP | 2009-169614 A | 7/2009 |

OTHER PUBLICATIONS

HTTP persistent connection. Accessed: Mar. 31, 2010, http://en.wikipedia.org/wiki/HTTP_persistent_connection.

Hypertext Transfer Protocol. Accessed: Mar. 31, 2010, http://en.wikipedia.org/wiki/HTTP_reguest#Reguest_message.

International search report and written opinion for corresponding international application No. PCT/FI2010/050842 dated Mar. 16, 2011, pp. 1-12.

Using Ajax for Desktop-like Geospatial Web Application Development, Han et al., 17th International Conference on Geoinformatics, Aug. 12-14, 2009, pp. 1-5.

* cited by examiner

700

METHOD AND APPARATUS FOR PROVIDING CLIENT-SIDE CACHING

BACKGROUND

Network service providers and device manufacturers are continually challenged to deliver value and convenience to consumers by, for example, providing compelling network services. One network feature that greatly improves user experience is client-side caching of, for instance, sessions variables which provides features such as personalization, automatic user authentication, and other forms of session persistence for network services. More specifically, client-side persistence or caching enables client devices to locally store information for authenticating, session tracking (e.g., state maintenance), etc., and for remembering specific information about users such as service preferences, browsing history, previous activities, and the like. This information can then be used to provide continuity in a user's service experience when the user begins a service session (e.g., a web browsing session) and then resumes the session at a later time. However, because information used for providing such persistence (e.g., login credentials, website visit history, etc.) can be sensitive, service providers and device manufacturers face significant technical challenges in protecting the information from disclosure or malicious exploitation while providing for increased functionality from client-side caching mechanisms.

SOME EXAMPLE EMBODIMENTS

Therefore, there is a need for an alternative approach for providing client-side caching to overcome the above mentioned limitations.

According to one embodiment, a method comprises receiving a request, from a device, for a scripting file associated with web content, the scripting file supporting client-side caching at the device. The method also comprises identifying that the request is received over a connection supporting connection reuse. The method further comprises determining whether the request is a first-time request. If the request is a first time request, the method comprises collecting session configuration information for the web content from the device, specifying session variables in the scripting file based on the session configuration information, and initiating a subsequent request for the scripting file over the connection. If the request is a subsequent request, the method also comprises marking the session variables in the scripting file as cacheable at the device, and causing, at least in part, transmission of the scripting file to the device According to another embodiment, an apparatus comprising at least one processor, and at least one memory including computer program code, the at least one memory and the computer program code configured to, with the at least one processor, cause, at least in part, the apparatus to receive a request, from a device, for a scripting file associated with web content, the scripting file supporting client-side caching at the device. The apparatus is also caused to identify that the request is received over a connection supporting connection reuse. The apparatus is further caused to determine whether the request is a first-time request. If the request is a first time request, the apparatus is further caused to collect session configuration information for the web content from the device, specify session variables in the scripting file based on the session configuration information, and initiate a subsequent request for the scripting file over the connection. If the request is a subsequent request, the apparatus is further caused to mark the session variables in the scripting file as cacheable at the device, and cause, at least in part, transmission of the scripting file to the device.

According to another embodiment, a computer-readable storage medium carrying one or more sequences of one or more instructions which, when executed by one or more processors, cause, at least in part, an apparatus to receive a request, from a device, for a scripting file associated with web content, the scripting file supporting client-side caching at the device. The apparatus is also caused to identify that the request is received over a connection supporting connection reuse. The apparatus is further caused to determine whether the request is a first-time request. If the request is a first time request, the apparatus is further caused to collect session configuration information for the web content from the device, specify session variables in the scripting file based on the session configuration information, and initiate a subsequent request for the scripting file over the connection. If the request is a subsequent request, the apparatus is further caused to mark the session variables in the scripting file as cacheable at the device, and cause, at least in part, transmission of the scripting file to the device.

According to another embodiment, an apparatus comprises means for receiving a request, from a device, for a scripting file associated with web content, the scripting file supporting client-side caching at the device. The apparatus also comprises means for identifying that the request is received over a connection supporting connection reuse. The apparatus further comprises means for determining whether the request is a first-time request. If the request is a first time request, the apparatus further comprises means for collecting session configuration information for the web content from the device, specifying session variables in the scripting file based on the session configuration information, and initiating a subsequent request for the scripting file over the connection. If the request is a subsequent request, the apparatus comprises means for marking the session variables in the scripting file as cacheable at the device, and causing, at least in part, transmission of the scripting file to the device.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing client-side caching are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
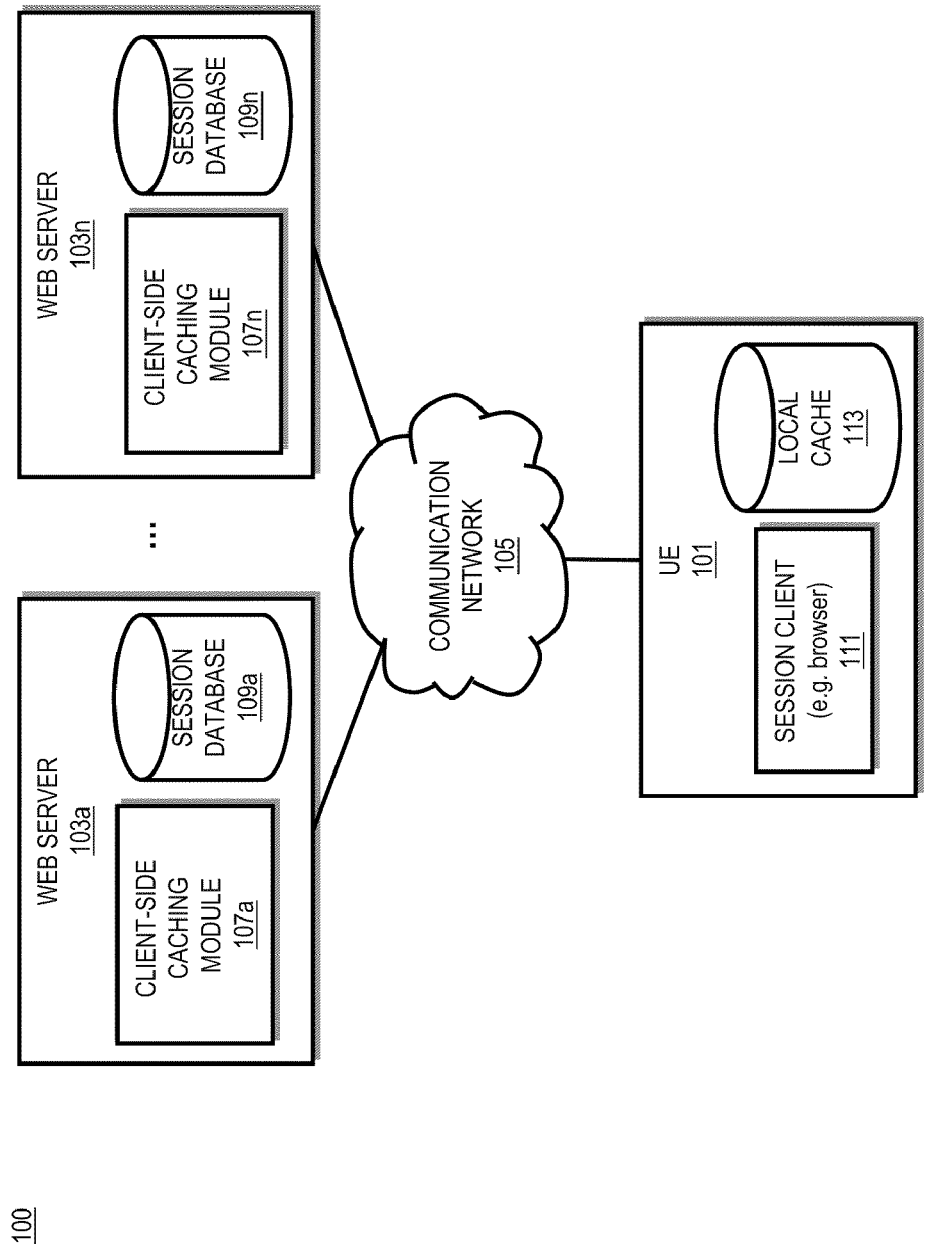
FIG. 1 is a diagram of a system capable of providing client-side caching, according to one embodiment.

FIG. 1 is a diagram of a system capable of providing client-side caching, according to one embodiment. As noted previously, many applications store data for completing or continuing application (e.g., web application) functions and tasks on the user device (i.e., client-side) rather than exclusively at the server. In this way, applications can reduce server load and complete internet tasks on the client-side as needed, thereby also reducing network bandwidth and resource use. The data stored or cached at the user device is generally referred to as client-side persistent data. In one embodiment, the client-side persistent data is a solution to the needs of Occasionally Connected Computing (OCC) which is computing for an architecture or framework which permits running some aspects of a web application when not connected to the internet. OCC is a software architecture based on the idea that an end user should be able to continue working with an internet application even when temporarily disconnected or when a wireless connection fails or is otherwise unavailable. Therefore, for the application to be operable in absence of an internet connection, the data required by the application need to be stored on the client site equipment.

In addition, it is contemplated that OCC principles may also be used when there is a network connection, but the service or application nonetheless prefers or is configured to store data for maintaining functional continuity at a client device. Historically, using cookies is one of the most popular methods of storing client-side persistence data. A cookie (e.g., a browser cookie or Hypertext Transport Protocol (HTTP) cookie) is generally a small piece of text stored on a user device by, for instance, a web browser or other application. A cookie consists of one or more name-value pairs containing limited bits of information such as user preferences, shopping cart contents, an identifier for a server-based session, or other data used by websites. However, there are problems and disadvantages for using cookies. For example, a cookie is specific to a single domain or web page. In other words, every two servers from different domains will need different cookies even if the two servers provide a related service that may share common login credentials (e.g., a calendar and an e-mail service provided by a common service provider at two different domains). Accordingly, users may have to enter redundant information to access the related websites. Further, more memory space and resources are needed for storing and managing an ever-growing list of cookies as the user visits more websites. In some cases, cookies can reduce system security because they can be used by intruders for attacking a system or stealing user data. It is now common for many users and even network operators to disable or block cookies, making the convenience of client-side persistence or caching unavailable to many users.

Moreover, client-side persistency or caching that is based on scripting languages (e.g., JavaScript) has generally been limited to providing static persistence information stored in global variables that cannot be changed or deleted. This limitation arises primarily from the condition that when a scripting file is cached at a user device (e.g., by a browser application of the user device) for the first time, the scripting file remains cached and cannot usually be updated with the dynamic information (e.g., persistence or state information). In other words, in a traditional use of a scripting file to provide client-side persistence or caching, once the scripting that is embedded in web content is loaded for the first time and cached with the accompanying web content, the file cannot be updated to reflect use activities with respect to that web content. Accordingly, any such persistence or other cached information would have to be known in advance and embedded in the content before the user interacts with the content, thereby limiting the potential application of such a form of scripting file.

To address this problem, a system 100 of FIG. 1 introduces the capability of providing client-side caching by servers using program scripts that are dynamically updatable after an initial access and caching of the scripts. More specifically, the system 100 enables the differentiation of two or more requests for the web content including the same scripting file. On a first access of the script, the system 100 can request session configuration information. Then on a subsequent access of the system 100 can incorporate the session configuration information into the script for caching and use at a client device. With the two step process for generating a script as introduced in the approach described herein, the system 100 overcomes the static content limitation of scripting files when used to provide client-side caching. Script-based client-side persistency or caching also advantageously overcomes the limitations of traditional cookies such as limited data capacity (e.g., due to the small size of the cookie), applicability to only one domain (e.g., persistence provided by a cookie is limited and subject to security vulnerabilities).

As shown in FIG. 1, the system 100 comprises a user equipment (UE) 101 having connectivity to one or more web servers 103*a*-103*n* via a communication network 105. In one embodiment, the UE 101 can access information or web content from a website that employs client-side persistence or caching managed by one or more of the servers 103*a*-103*n*. For example, the UE 101 sends a request for the web content to at least one of the servers 103*a*-103*n* using a browser application (e.g., session client 111). On receipt of the request, the web server 103 generates web content code (e.g., hypertext markup language (HTML) code) that includes a scripting file (e.g., a JavaScript file) for storing web session information and providing client-side persistence. In one embodiment, the server 103 includes a client-side caching module 107 for generating the client-side persistency scripting file. The scripting file provides logic for: (1) creating session variables to store user identification, authentication, or other session related information; (2) storing the session variables in the scripting file; and then (3) caching the scripting file containing the session variables at the UE 101 (e.g., in the local cache 113 of the UE 101). The cached session variables can then be retrieved from the local cache 113 and used to provide client-side persistency on future requests for the same web content and/or session.

In one embodiment, when the session client 111 of the UE 101 accesses the scripting file as referenced in the requested web content, the scripting file causes the client persistency module 107 to determine whether the request is a first request to access the content (i.e., a request before a client-side persistency file has been created or a requests where no previous session information exists). If the request is a first request, the client persistency module 107 creates session variables based on session configuration information collected from the UE 101 or a user of the UE 101, stores those variables as session variables, and immediately directs the session client 111 to refresh the rendering of the web content including the accompanying scripting file. On the refresh, the client-side caching module 107 detects that the session client 111 is requesting access to the content and scripting file for a second (or subsequent) time. At the same time, the refresh enables the clearing of the initial scripting file provided in the web content so that the client-side caching module 107 can cache an updated version of the scripting file (e.g., a version of the scripting file modified to contain session configuration variables). In particular, the detection and differentiation of the second request causes, for instance, the client-side caching module 107*a* to complete the scripting file creation process by storing the session variables in the scripting file, marking the scripting file for caching at the UE 101, and transmitting the scripting file to the UE 101.

It is noted that the process described herein depends on the ability of the client-side caching module 107*a* to differentiate between two requests for the same web content. However, most web content is currently delivered using HTTP which is generally defined as a stateless client/server protocol. As a result, an HTTP server typically cannot recognize any differences between two requests for the same resource. Therefore, it is a significant technical challenge to differentiate between such requests using HTTP. To address this challenge, the client-side caching module 107*a* exploits the availability of a connection supporting connection reuse (e.g., a persistent connection) between the UE 101 and the server 103 to create and cache the session variables in the scripting file. As used herein, a connection supporting connection reuse refers to a connection that can handle multiple request/response transactions using the same connection. For example, the current version of HTTP (e.g., 1.1) introduces KeepAlive connections as a type of connection that supports connection reuse. These types of connections can also be referred to as persistent connection. Because multiple requests can be handled over the same connection, the persistent nature of the KeepAlive connections enables the client-side caching module 107*a* to determine the relative order of requests for the same web resource when the requests are received over the same connection (e.g., persistent connection). In this way, the client-side caching module 107*a* can sequentially generate session variables, incorporate them in the scripting file (i.e., update the scripting file), and cache the updated scripting file at the UE 101.

It is noted that although various embodiments of the system 100 are described with respect to an HTTP 1.1 KeepAlive connection, it is contemplated that the approach described herein is applicable to any persistent connection, other type of connection supporting connection reuse between a web server and a client, or mechanism for determining the relative order of two requests for the same web content or resource.

For example, in certain embodiments, the system 100 can employ Hypertext Transfer Protocol Secure (HTTPS) connections which combine HTTP with Transport Layer Security (TLS)/Secure Sockets Layer (SSL) to provide encryption and secure identification of servers. More specifically, the use of HTTPS in the approach described herein enables the system 100 to use a session identifier (session ID) associated with each HTTPS connection to relate a client and server pair event if the client makes new socket connections on the server. This ability to relate a client and server pair over multiple socket connections enables the system 100 to reuse the connection for multiple requests between the paired client and server. The reuse of the connection, in turn, enables the system 100 to determine the relative order or sequence of the requests.

The session client 111 can then use the cached scripting file and session variables to render the requested web content and provide client-side persistency between multiple web sessions. For example, a user of the UE 101 may close the session client 111, re-launch it, and request the same session again. In this case, the UE 101 already has session variables (e.g., within the cached scripting file) in the local cache 113, and therefore the user will not be prompted by the client-side caching module 107 to provide configuration data, unless the user chooses to reload the session or have session data removed from local cache 113 beforehand.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101 and the client-side caching module 107*a*-107*n* communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
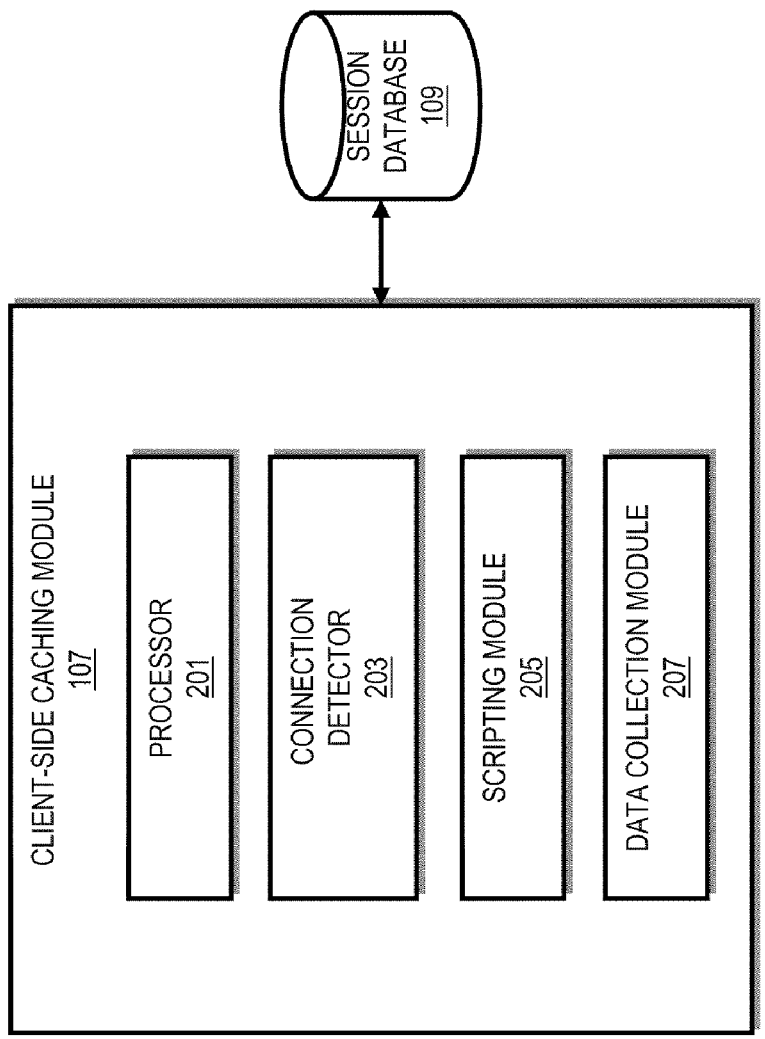
FIG. 2 is a diagram of the components of a client-side caching module, according to one embodiment.

FIG. 2 is a diagram of the components of a client-side caching module, according to one embodiment. By way of example, the client-side caching module 107 includes one or more components for providing client-side persistency using a scripting file. It is contemplated that the functions of these components may be combined in one or more components or performed by other components of equivalent functionality. In this embodiment, the client-side caching module 107 includes at least a processor 201 or other control logic for executing at least on algorithm for performing the functions of the client-side caching module 107. For example, the processor 201 interacts with the connection detector 203 to identify whether a particular request or requests for the same web content or session are received over a connection supporting connection reuse (e.g., a KeepAlive connection or other persistent connection). In one embodiment, the connection detector 203 may have access to the socket (e.g., the transmission control protocol (TCP) socket) used by the session client 111 to communicate with the web server 103. The connection detector 203 may obtain an identifier (e.g., socket identifier (ID)) associated with the socket to identify the corresponding connection as a connection supporting connection reuse (e.g., a persistent connection). In addition or alternatively, the web server 103 may use different worker processes/threads to process each new incoming request for a web resource. The worker process/thread then processes further requests between the client and web server 103 in the same connection. Thus, the connection detector 203 can determine an identifier associated with the appropriate worker process/thread to identify the persistent or reusable connection.

After identifying the connection, the processor 201 interacts with a scripting module 205 for generating cacheable session variables as described with respect to FIG. 1. More specifically, the scripting module 205 determines when a client-side persistency script is cached at the UE 101 for a first time (e.g., when there is not previously stored session data or the session data has been cleared). The detection is performed using the connection supporting connection reuse as described with respect to FIG. 1. If determination is that the scripting file is cached for the first time, the scripting module 205 interacts with the data collection module 207 to collect session configuration information from the UE 101 or the user of the UE 101. In one embodiment, the data collection module 207 initiates transmission of a form to the UE 101 for collecting the information. On receiving the session configuration information, the data collection module 207 can store the information as session variables in for in session database 109 for processing. Then, the scripting module 205 can incorporate the session variables in the scripting file and mark the file and variables for caching at the UE 101 when the scripting module 205 detects a second or subsequent request for the scripting file.

Figure 3:
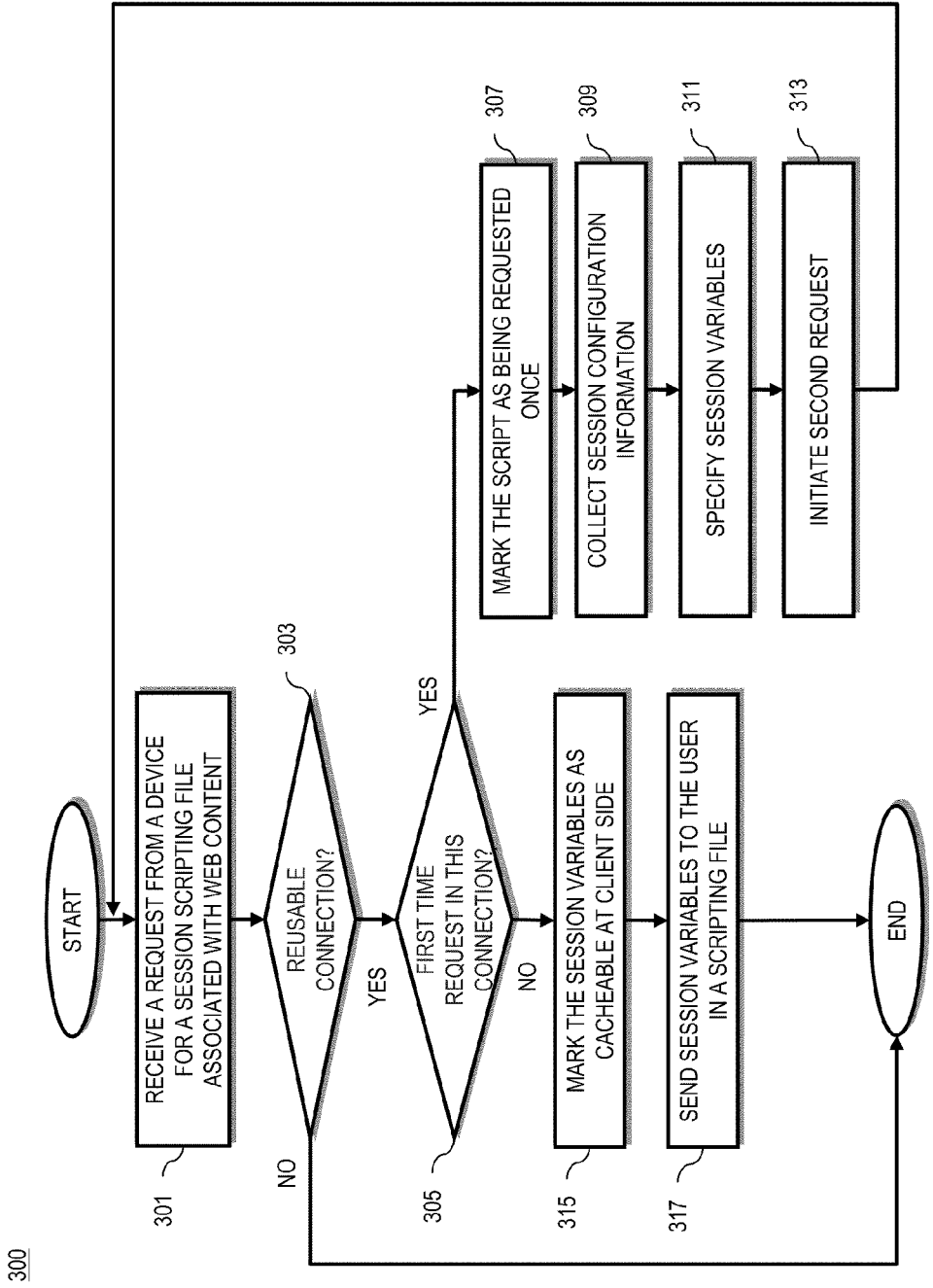
FIG. 3 is a flowchart of a process for providing client-side caching to a device for the first request of web content, according to one embodiment.
Figure 9:
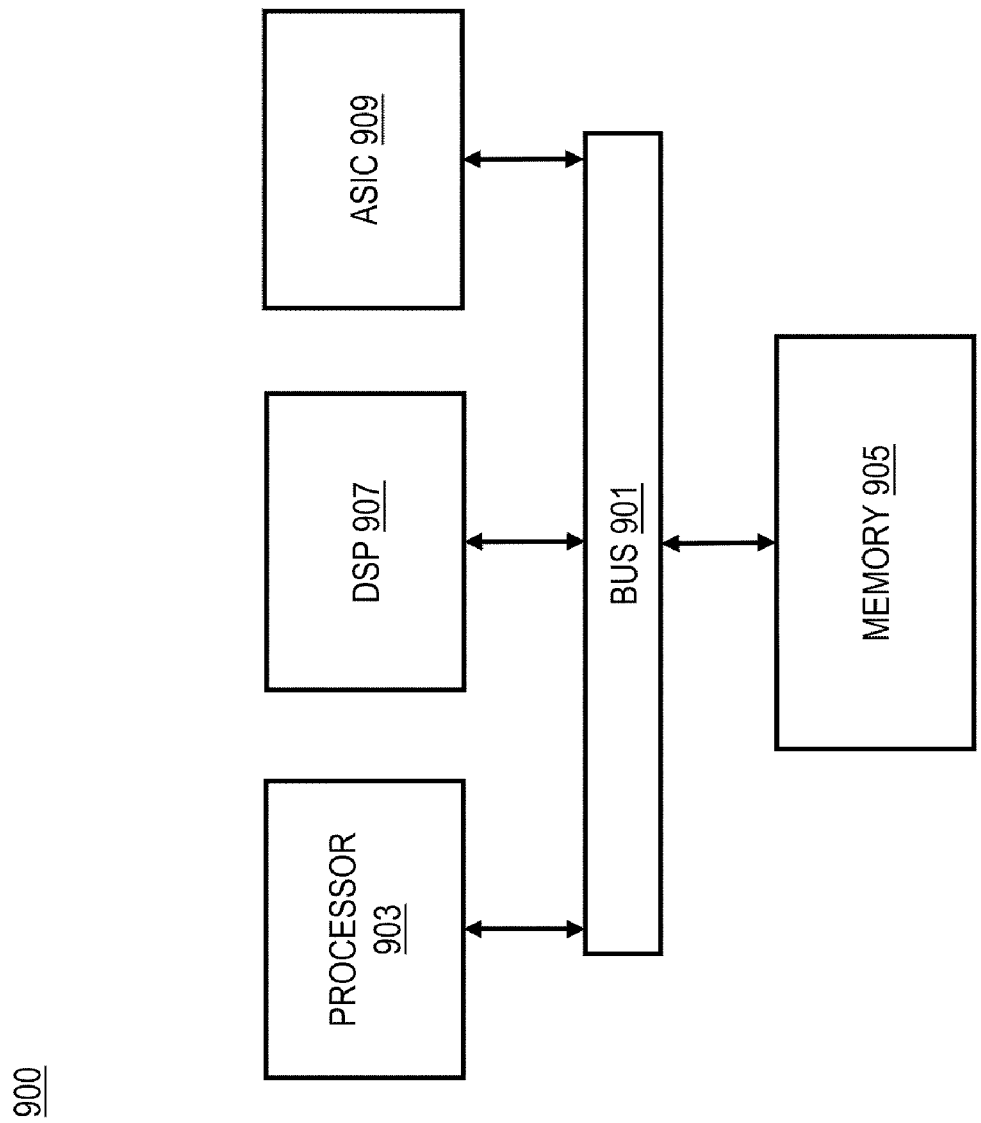
FIG. 9 is a diagram of a chip set that can be used to implement an embodiment of the invention.

FIG. 3 is a flowchart of a process for providing client-side caching, according to one embodiment. In one embodiment, the client-side caching module 107 performs the process 300 and is implemented in, for instance, a chip set including a processor and a memory as shown in FIG. 9. In step 301, the client-side caching module 107 receives a request for accessing web content from a UE 101. The request may include a request for a session script. In response to the request, the client-side caching module 107 determines whether the request was received over a connection supporting connection reuse between the UE 101 and the web server 103 (step 303). In one embodiment, the module 107 can verify the HTTP version used for communication and whether it supports such connections (e.g., KeepAlive connections or other persistent connection). If the request was not received over a persistent or reusable connection, the process 300 ends. If the request was received over a persistent or reusable connection, the client-side caching module 107 determines whether the request (and subsequent caching) of the scripting file is a first request (step 305). As described previously, for differentiation between the first request and the subsequent requests a server can identify different KeepAlive connections any of several methods for identifying KeepAlive connections by a server. For example, since the client-side caching module 107 has access to the TCP socket that is used by the web server 103 and the session client 111 of the UE 101 for communication, the socket ID can be used to differentiate KeepAlive sessions. Furthermore, the web server 103 can use different worker processes/threads for processing each new incoming request. Typically, a particular worker process/thread will also process further requests in the same KeepAlive connection. Therefore, the client-side caching module 107 can use the worker process/thread ID to identify different KeepAlive sessions.

If the requests is the first request, the client-side caching module 107 marks the script as being requested once so that the next time it is requested, the client-side caching module 107 knows that this script has been requested once before and should be updated with session information if available. Since this is the first request, the client-side consistency module 107 generates a session for communication between the requesting UE and the requested web content. In order to create a session, the client-side caching module collects session configuration information from the requesting UE 101 as shown in step 309. The configuration information may include user identification and authentication information, UE 101 specification, the requested website address, any regulations that may affect the user access to the content of the requested website, etc. Some parts of the session configuration information may be automatically collected from the device specifications, however other parts of the information such as user identification or login credentials are collected from the user of the UE 101. For collecting the user related information, the client-side caching module 107 provides an interface to the user to enter session configuration information. After collection of the session configuration information (e.g., either automatically from the UE 101 or manually from the user), the client-side caching module 107 specifies session variables using the information collected (step 311). The session variables are included in an updated session scripting file to be sent to the UE 101 on detection of a second request for or access of the scripting file. Accordingly, the client-side caching module 107 initiates a second request by, for instance, directing the session client 111 to refresh or reload the requested web content (step 313).

Because of the refresh and reloading, when the client-persistency module 107 returns to step 305 to determine whether the request for the web content and scripting file is first request, the module 107 makes a determination that the request is a second request and not a first request. This means that session variables for the requested session have been already specified. In other words, the client-side caching module 107 has already completed the process to generate the session variables as described with respect to steps 307 to 313. Knowing that this is the second request from the script marked in step 307, the client-side caching module 107 marks the session variables specified in step 311 as cacheable so that the UE 101 is able to store the variables in its local cache 113 (step 315). In step 317, the client-side caching module 107 sends the session variables to the UE 101. For example, the session variables are included in a session scripting file and the scripting file is sent to the UE 101 with the web content. In other words, because the web content includes the embedded scripting file, the second request of the scripting file results in transmission of the updated scripting file (e.g., the scripting file including the session variables) for caching at the UE 101.

In another embodiment, the client-side caching module 107 can limit the scope of the session variables to prevent an intruder from gaining access to session variables by, for instance, inviting users to visit malicious websites, placing a reference to the session on original server in the website, changing browser setup to load a session from local cache instead of the server, or setting up the browser to send session variables back to a malicious website. By way of example, the module 107 can limit the scope of variable by using local variables instead of global variables as session variables. Moreover, the module 107 may place restrictions on the websites that are allowed to access the variables. The sample code of Table 1 an implementation of such a scope limitation.

TABLE 1

```
function get_private_session( ) {
    var private_session_id = "ID setup by User and Server";
    if (window.location.host != "Server hostname or any other allowed
    websites") {
        return 0;
    } else {
        return private_session_id;
    }
}
```

The window.location.host in Table 1 is a reserved variable which tells the host name of the website where the current page is downloaded from. Therefore, with this technique the scope of a session variable is flexibly set. For example, the website "sample1.com" may setup a session variable and allow "sample2.com" to use the variable. In contrast, traditional cookies have strict restrictions on session variables so that a cookie session variable can be used only in the scope of the original web server where the cookie is setup.

Figure 4:
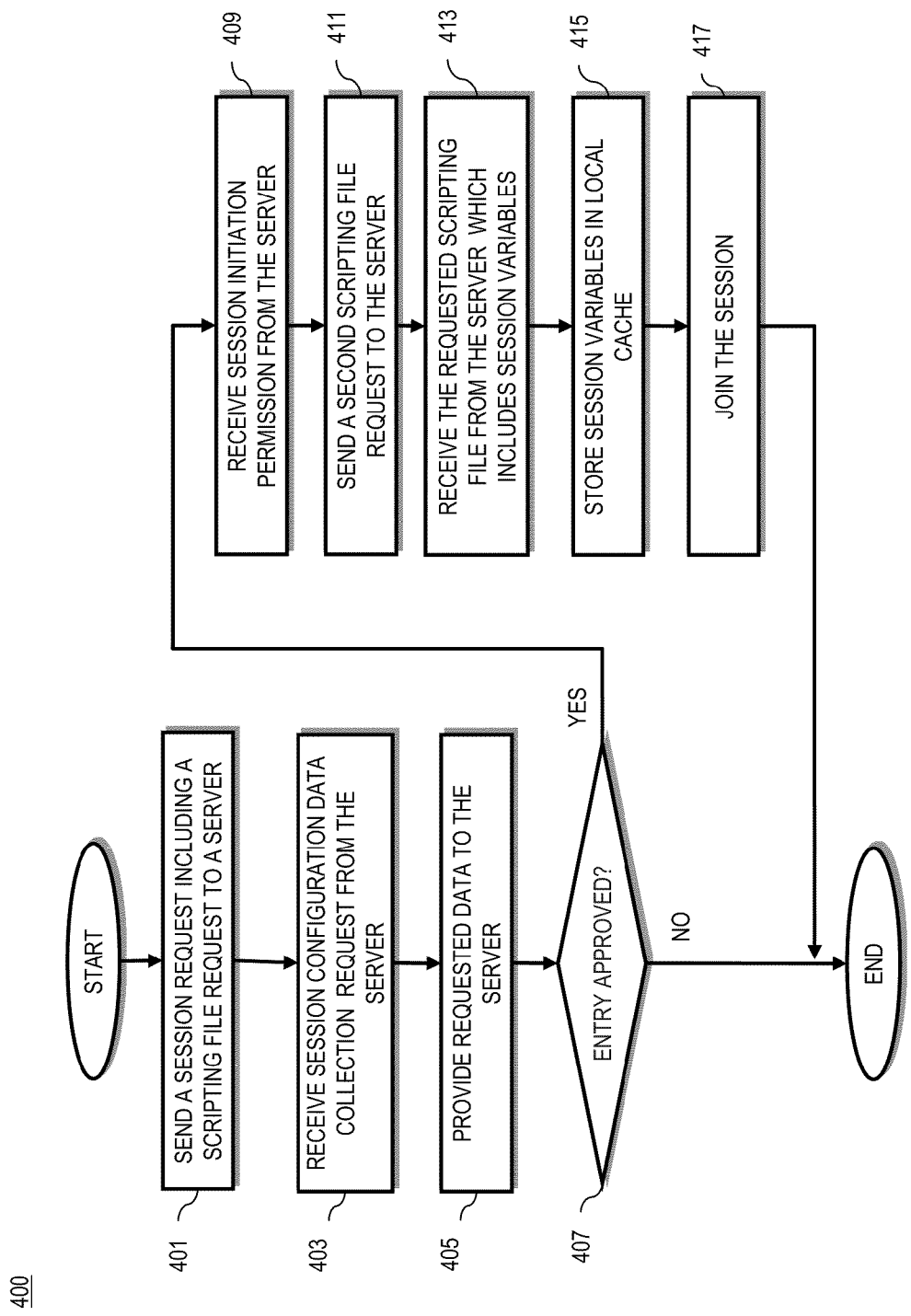
FIG. 4 is a flowchart of a process for a user requesting web content from a server, according to one embodiment.

FIG. 4 is a flowchart of a process for a user requesting web content from a server, according to one embodiment. In one embodiment, the session client 111 of the UE 101 performs the process 400 and is implemented in, for instance, a chip set including a processor and a memory as shown in FIG. 9. In one embodiment, the UE 101 activates the session client 111 to gain access to web content that uses client-side persistence or caching. In step 401, the session client 111 generates a session request for communication establishment between the UE 101 and the web server 103 for the content and sends the request to the server 103. Because the web content includes client-side persistency, the session request also includes a request for a scripting file that can provide client-side persistence. In step 403, the session client 111 receives a request from the server to provide information related to session establishment (e.g., user ID, Password, etc.). In one embodiment, the server data collection request may include a form for manual entry of the session configuration information. In addition or alternatively, the server 103 (e.g., via the client-side caching module 107) may read the session configuration information directly from UE 101 (e.g., from the local cache 113). If the user information gets approved (e.g., the information includes any authentication information for retrieving the content) by the server per step 407, the session client 111 receives session initiation permission from the server (step 409). By way of example, the permission can include commands or messages for initiation of a second request (e.g., a refresh command) for the scripting file as described with respect to step 313 of FIG. 3. Upon receiving the permission and/or refresh command, the session client 111 sends a second request for the scripting file to the server in step 411, using the information included in the permission message. In step 413, the session client 111 receives the requested scripting file including session variables which has been produced per step 317 of FIG. 3. Since the server has marked the session variables as cacheable at client side, the session client 111 refreshes and stores the session variables in the local cache 113 (step 415). In step 417, the session client 111 starts communicating with the website through the session generated by the server and using session variables from the local cache 113 of the UE 101.

In another embodiment, the session client 111 can send the server 103 a request that has already been adapted with the persistency or other cached information. In other words, the session client 111 modifies the content request based on the session variables stored in the local cache 113 so that the request will ask specifically for content that provides for continuation of a previous session. The server 103 then returns only the content that satisfies the adapted request. In addition, the session client 111 can include an authentication header in the request for content from the server 103. The authentication is found from client-side caching, and the server 103 returns the requested content.

Figure 5:
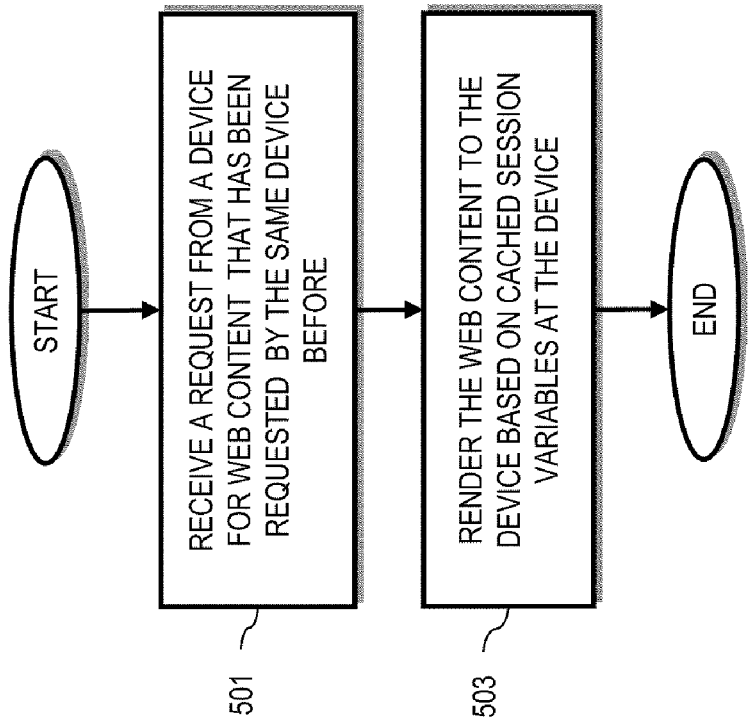
FIG. 5 is a flowchart of a process for providing client-side caching to a device for a subsequent request of web content, according to one embodiment.

FIG. 5 is a flowchart of a process for providing client-side caching to a device for a subsequent request of web content, according to one embodiment. As seen in FIG. 3, the first time a UE 101 requests web content for a particular website, a communication session (e.g., web session) between the UE 101 and the website is generated by the corresponding web server 103. As part of creating this web session, the client-side caching module 107 of the web server 103 generates and caches session variables in the local cache 113 of the UE 101 as previously described. Therefore, for any subsequent request that the session client 111 of the UE 101 makes for the same web content or website, the session variables can be retrieved by the session client 111 from the local cache 113. Accordingly, in step 501, the server 103 receives a request from a UE for web content that has been requested before by the same UE 101 via the session client 111. The web server returns the requested web content to the session client 111. In response, the session client renders the web content by retrieving the reference client-side persistency script from the local cache 113. More specifically, the session client 111 extracts the session variables from the cached scripting file and applies the session variables to render and present the content. In this way, the content can be presented in a state determined by a previous web session.

Figure 6:
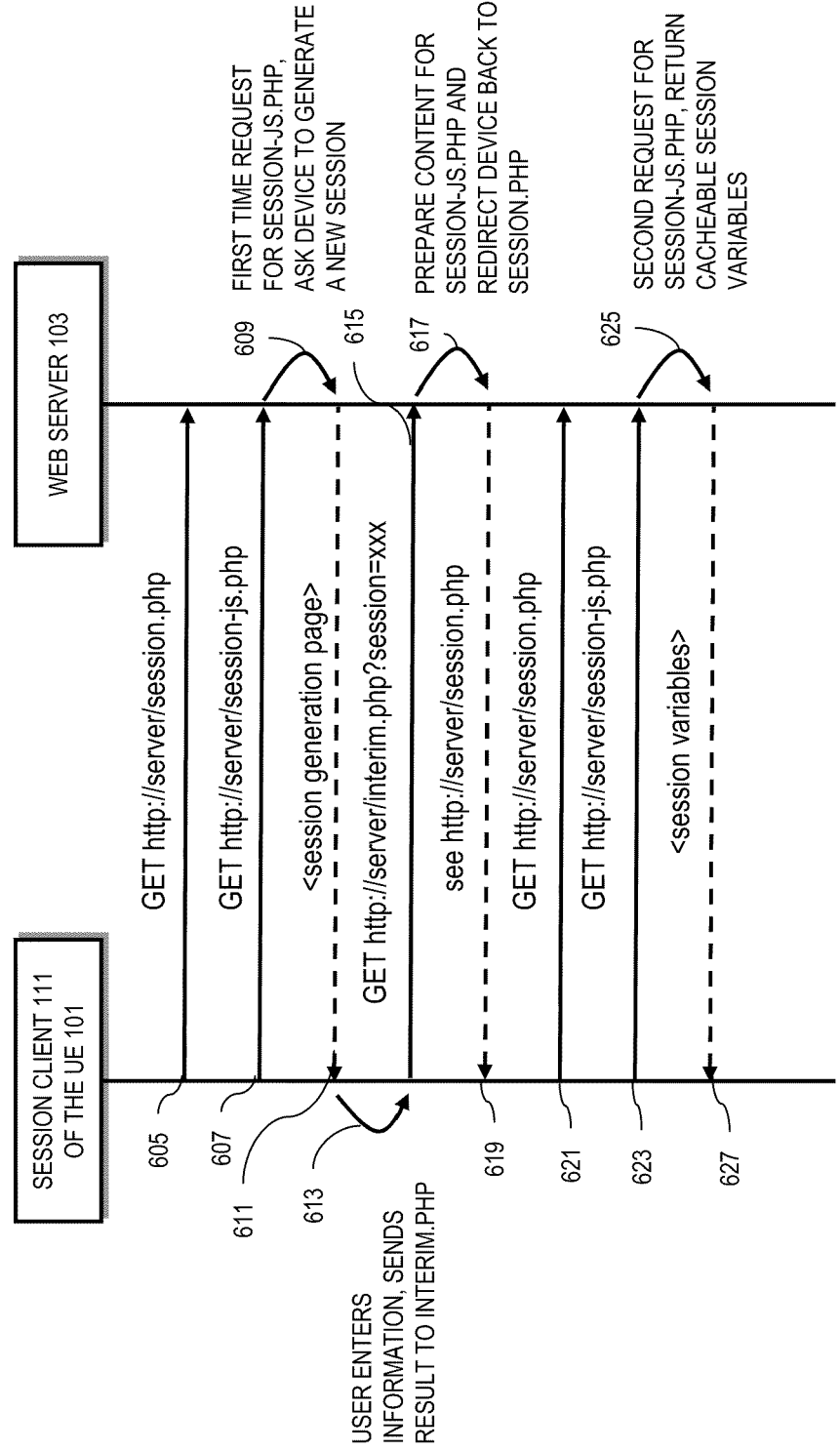
FIG. 6 is a time sequence diagram that illustrates a sequence of messages and processes for providing client-side caching, according to one embodiment.

FIG. 6 is a time sequence diagram that illustrates a sequence of messages and processes for providing client-side persistency, according to one embodiment. A network process is represented by vertical line. A message passed from one process to another is represented by horizontal arrows. A step performed by a process is indicated by the text. The processes represented in FIG. 6 are the session client 111 of the UE 101 and the web server 103. The example of FIG. 6 discusses the process 600 for providing client-side persistency using JavaScript and HTTP.

At 605, the session client 111 requests a webpage on the web server 103 that includes client-side persistency support. The web server 103 returns the webpage as "session.php" that further references the client-side persistency scripting file "session-js.php". On receipt of the webpage, the session client 111 makes a request for the session-js.php script in order to render the session.php webpage (at 607). In this example, the web server 103 determines that this request is the first time that the session client 111 is requesting the session-js.php script (at 609) and sends a form for the session client 111 or a user of the session client 111 to generate a new session in the session-js.php script (at 611).

At 613, the user of the session client 111 fills the form, and the session client 111 sends the form results to a separate webpage, "interim.php", on the web server 103. Upon receiving the interim.php webpage, the web server 103 prepares the session information according to the information provided in the form (at 617). At the same time, the web server 103 redirects the browser back to the session.php webpage to refresh the webpage and corresponding script at the session client 111 (at 619).

In response to the redirect, the session client 111 makes another request to the web server 103 for the session.php webpage (at 621). When rendering the session.php webpage, the session client 111 also makes another request for the session-js.php script referenced in the session.php webpage based on the redirect or refresh command from the web server 103 (at 623). The web server 103 receives the redirected request for the session-js.php script and determines that the redirected request is a second request for the session-js.php script (at 625). Accordingly, the web server 103 creates session variables from the information collected at 617 and returns the session variables in the session-js.php script (at 627). Before transmitting the updated script, the web server 103 also marks the session variables as cacheable at the client side (e.g., at the UE 101). The updated session-js.php script then is used by the session client 111 to complete rendering of the session.php webpage based on the session variables.

In one embodiment, JavaScript can be used as the language of the scripting file associated with the web content. Table 2 is a sample implementation of the session using JavaScript and is described with respect to the processes of FIG. 6.

TABLE 2

Sample implementation

```
//////////////////////////////// COMPONENT 1 ////////////////////////////////
y3fu@ibex:/var/www$ cat globals.php
<?php
$g_server_hostname = "localhost";
$g_session_file_folder = "/tmp";
?>
//////////////////////////////// COMPONENT 2 ////////////////////////////////
y3fu@ibex:/var/www$ cat session-js.php
<?php
    include "globals.php";
    $pid = getmypid( );
    $filename = "$g_session_file_folder/$pid.dat";
    if (file_exists($filename)) {
            header("Cache-Control: max-age=3600");
            $fp = fopen($filename, "r");
            $line = fgets($fp);
            while ($line) {
                echo $line;
                $line = fgets($fp);
            }
            fclose($fp);
            unlink($filename);
?>
function foo( ) {
}
<?php
    } else {
?>
function login( ) {
    var location = "http://<?php echo $g_server_hostname;
?>/interim.php?session=" + document.getElementById('session').value;
    window.location=location;
}
function foo( ) {
    var myHTML = "<input id='session'/><input type='button' value='OK' onclick='login( )'/>";
    document.getElementById('uiBody').innerHTML = myHTML;
}
<?php
```

TABLE 2-continued

Sample implementation

```
    }
?>
////////////////////////////////// COMPONENT 3 //////////////////////////////////
y3fu@ibex:/var/www$ cat interim.php
<?php
    require "globals.php";
    $session = htmlspecialchars($_GET["session"]);
    $pid = posix_getpid( );
    $filename = "$g_session_file_folder/$pid.dat";
    if (file_exists($filename)) {
        echo "fatal error";
    } else {
        $fp = fopen($filename, "w");
        $line = "var session_id=$session;\n";
        fwrite($fp, $line);
        $line = "
function get_private_session( ) {
    var private_session_id = session_id + 1;
    if (window.location.host != '$g_server_hostname') {
        return 0;
    } else {
        return private_session_id;
    }
}";
        fwrite($fp, $line);
        fclose($fp);
        header("Location: http://$g_server_hostname/session.php");
    }
?>
////////////////////////////////// COMPONENT 4 //////////////////////////////////
y3fu@ibex:/var/www$ cat session.php
<html>
<head>
<script language="JavaScript" src="session-js.php"></script>
<script type="text/javascript" language="JavaScript">
function print_session( ) {
    if (session_id) {
        alert("session is: " + session_id + ", private session is: " + get_private_session( ));
    } else {
        alert("no session setup yet");
    }
}
</script>
</head>
<body onload="foo( )">
<span id="uiBody"></span>
<input type="button" value="Check Session" onclick="print_session( )"/>
</body>
</html>
```

The first component of Table 2 (component 1) is the initialization component in which the host name and the location of session variables are defined. Component 2 of Table 2 is the scripting file as discussed in FIG. 3. Referring back to process 605 of FIG. 6, the session client 111 sends a request to the web server 103 using the GET command and asks for session.php webpage which is the component 4 in Table 2.

As seen in component 4 of Table 2, the session.php webpage references the session-js.php script as reflected in process 607 of FIG. 6. The session-js.php script illustrated as component 2 of Table 2. Execution of the script session-js.php by the server causes the server 103 to check whether this is the first request for the filing script and create a new session as per process 609 of FIG. 6. At 611, the server sends a request to the UE for the user data needed for session configuration. At 613, the user enters requested information into the interface provided by the server 103, and per process 615, the session client 111 sends the information to the server 103 through interim.php which is component 3 of Table 2. At 617 of FIG. 6, the server 103 prepares the content of the scripting file (e.g., session-js.php) based on the configuration information received from the user through interim.php, and at 619, the server 103 directs the user to session.php for second time. Processes 621 and 623 are the second time repeats of processes 605 and 607 where rendering of session-.php will call session-js.php. However unlike at 609, the server 103 knows that this is the second request for session-js.php (at 625). Therefore, the server 103 marks session variables prepared in process 617 as cacheable, and per process 627 sends the variables to the session client 111.

The described approach imposes no restrictions on session variables meaning that the variables can even be functions of a programming language (e.g. JavaScript). Basing the session variables on a scripting language advantageously enables the scripting file to support a greater variety and quantity of client-side persistency functions. In contrast, as noted previously, cookies are character strings of relatively small finite sizes whose functions are easily and routinely blocked or otherwise limited by specification, operators, users, applications (e.g., browsers) and the like. Furthermore, in the described approach, session variables can be flexibly configured to be used by one or more websites, while cookies can typically be used only on the website where they are originally setup. The introduced process also advantageously enables client-side persistency scripts be dynamically updated to reflect changing session variables and conditions.

Figure 7:
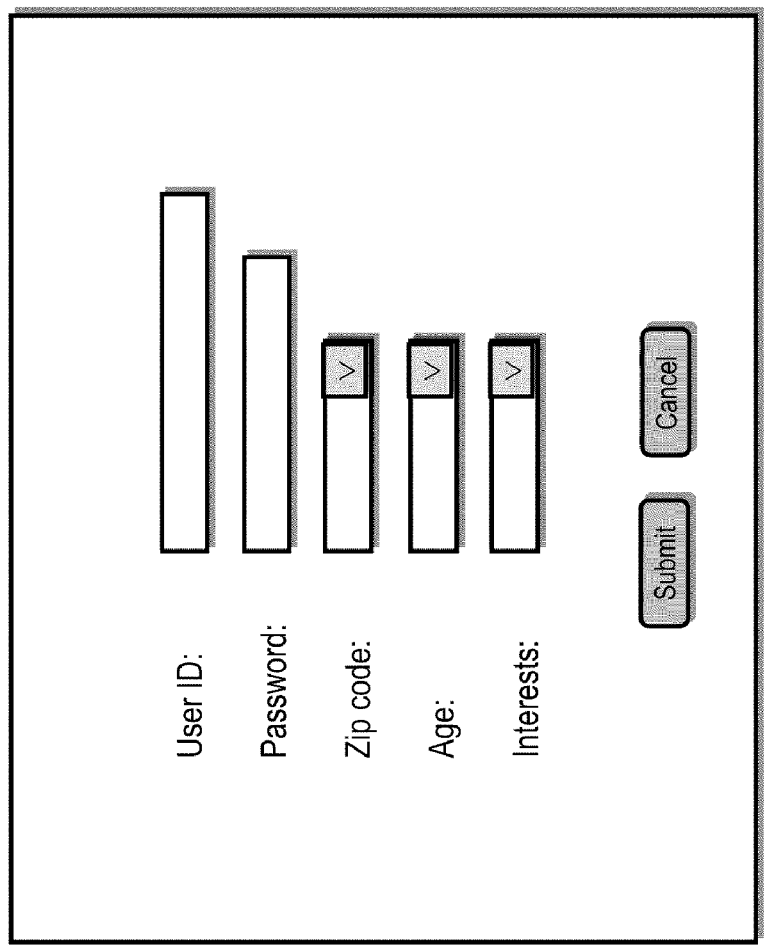
FIG. 7 is a diagram of an example user interface for providing data related to client-side caching, according to one embodiment.

FIG. 7 is a diagram of an example user interface for providing data related to client-side caching, according to one embodiment. As described previously, in order to generate a session between a UE 101 and a website, the web server 103 may request session configuration information from the user. In this case, the server 103 may create a form and send it to the session client 111 of the UE 101 for the user and/or the UE 101 to complete and return it to the server 103. FIG. 7 is a sample user interface requesting such information. In this example, the user and/or the UE 101 will enter the user ID and password for authentication purposes. Depending on the requested web content, the server 103 may also ask for other information such as the user's zip code, age and interest categories using a dropdown menu, in order to be able to provide the user with better or customized services.

The processes described herein for providing client-side caching may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
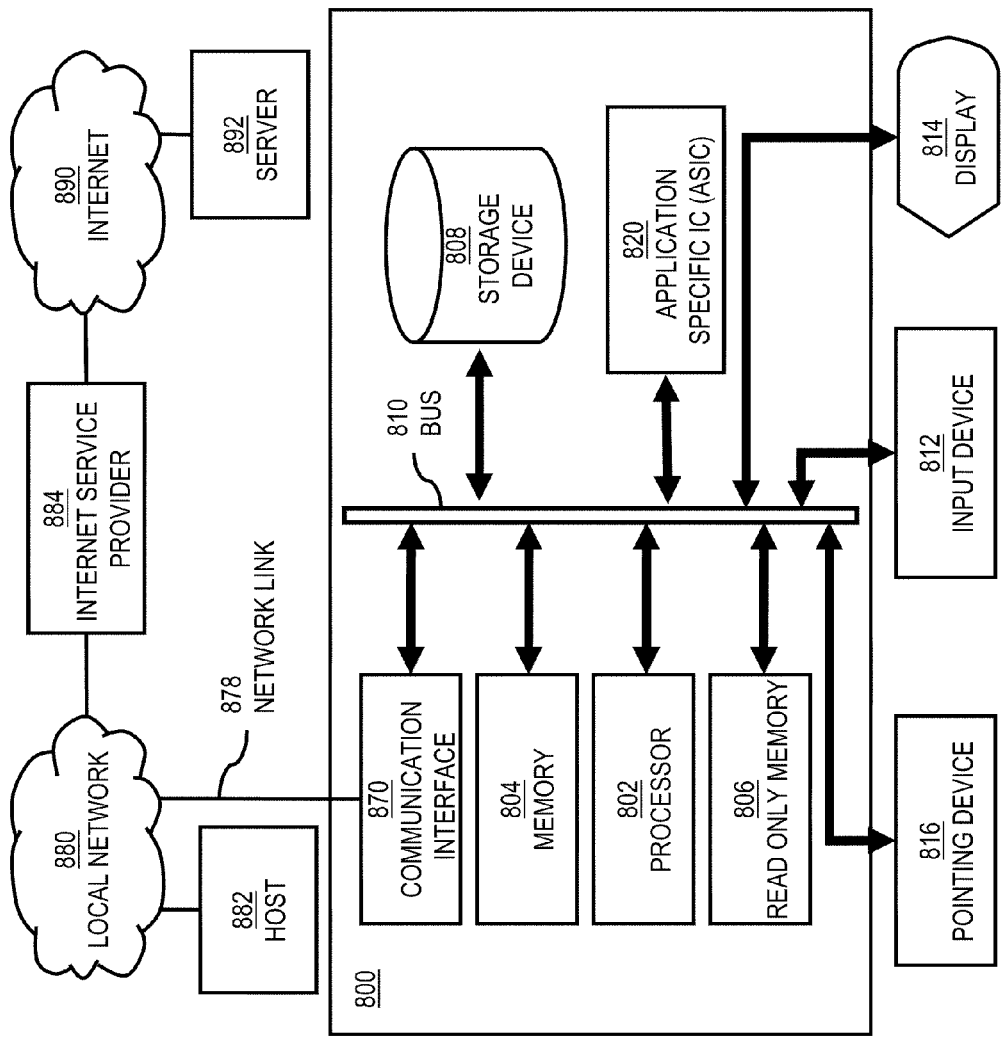
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide client-side caching as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing client-side caching.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing client-side caching. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing client-side caching. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing client-side caching, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing client-side caching to the UE 101.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set 900 upon which an embodiment of the invention may be implemented. Chip set 900 is programmed to providing client-side caching as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of providing client-side caching.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide client-side caching. The memory 905 also stores the data associated with or generated by the execution of the inventive steps.

Figure 10:
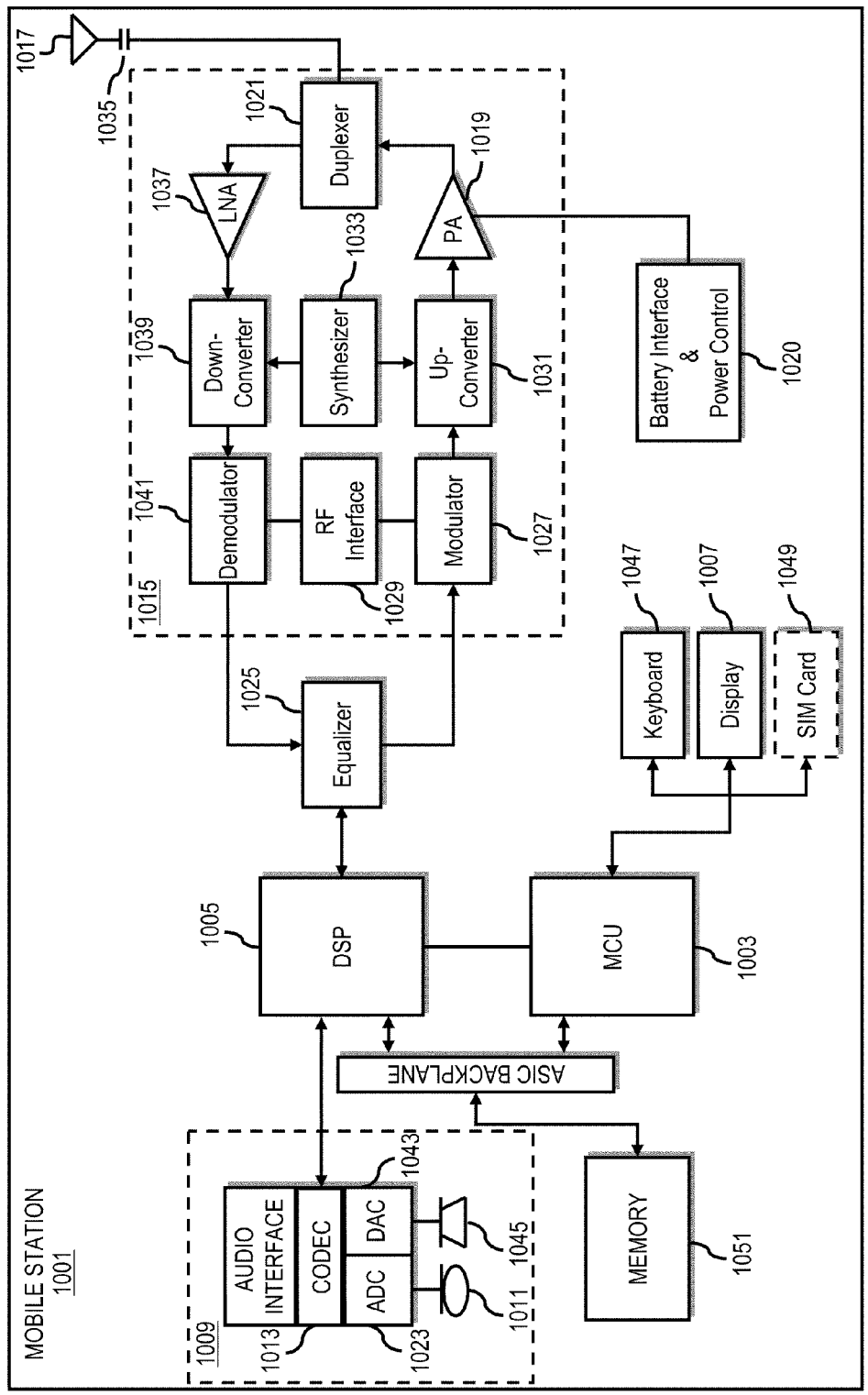
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of providing client-side caching. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing client-side caching. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide client-side caching. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a request, from a device, for a scripting file associated with web content, the scripting file supporting client-side caching at the device;
    identifying that the request is received over a connection supporting connection reuse;
    determining whether the request is a first-time request;
    if the request is a first time request, collecting session configuration information for the web content from the device, specifying session variables in the scripting file based on the session configuration information, and initiating a subsequent request for the scripting file over the connection; and
    if the request is a subsequent request, marking the session variables in the scripting file as cacheable at the device, and causing, at least in part, transmission of the scripting file to the device.

2. A method of claim 1, further comprising:
    receiving another request, from the device, for the web content associated with the scripting file; and
    causing, at least in part, rendering of the web content based on the cached session variables.

3. A method of claim 1, wherein the session variables are local to the device and apply only to the associated web content.

4. A method of claim 1, wherein the session configuration information applies to multiple domains, the method further comprising:
    specifying the multiple domains in the session variables.

5. A method of claim 1, wherein the scripting file is removed from the device after a predetermined period of time or at the request of a user of the device.

6. A method of claim 1, wherein the connection is a Hypertext Transfer Protocol (HTTP) Keep-Alive connection, and wherein the identifying of the connection is based on a Transmission Control Protocol (TCP) socket identifier, a worker process identifier, a thread identifier, or a combination thereof corresponding to the HTTP Keep-Alive connection.

7. A method of claim 1, wherein the scripting file is a JavaScript file.

8. An apparatus comprising:
    at least one processor; and
    at least one memory including computer program code,
    the at least one memory and the computer program code configured to, with the at least one processor, cause the apparatus to perform at least the following,
        receive a request, from a device, for a scripting file associated with web content, the scripting file supporting client-side caching at the device;
        identify that the request is received over a connection supporting connection reuse;
        determine whether the request is a first-time request;
        if the request is a first time request, collect session configuration information for the web content from the device, specify session variables in the scripting file based on the session configuration information, and initiate a subsequent request for the scripting file over the connection; and if the request is a subsequent request, mark the session variables in the scripting file as cacheable at the device, and cause, at least in part, transmission of the scripting file to the device.

9. An apparatus of claim 8, wherein the apparatus is further caused to:

receive another request, from the device, for the web content associated with the scripting file; and cause, at least in part, rendering of the web content based on the cached session variables.

10. An apparatus of claim 8, wherein the session variables are local to the device and apply only to the associated web content.

11. An apparatus of claim 8, wherein the session configuration information applies to multiple domains, and the apparatus is further caused to:

specify the multiple domains in the session variables.

12. An apparatus of claim 8, wherein the scripting file is removed from the device after a predetermined period of time or at the request of a user of the device.

13. An apparatus of claim 8, wherein the connection is a Hypertext Transfer Protocol (HTTP) Keep-Alive connection, and wherein the identifying of the connection is based on a Transmission Control Protocol (TCP) socket identifier, a worker process identifier, a thread identifier, or a combination thereof corresponding to the HTTP Keep-Alive connection.

14. An apparatus of claim 9, wherein the scripting file is a JavaScript file.

15. An apparatus of claim 9, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

16. A non-transitory computer-readable storage medium carrying one or more sequences of one or more instructions which, when executed by one or more processors, cause an apparatus to at least perform the following steps:

receiving a request, from a device, for a scripting file associated with web content, the scripting file supporting client-side caching at the device;

identifying that the request is received over a connection supporting connection reuse;

determining whether the request is a first-time request;

if the request is a first time request, collecting session configuration information for the web content from the device, specifying session variables in the scripting file based on the session configuration information, and initiating a subsequent request for the scripting file over the connection; and if the request is a subsequent request, marking the session variables in the scripting file as cacheable at the device, and causing, at least in part, transmission of the scripting file to the device.

17. A non-transitory computer-readable storage medium of claim 16, wherein the apparatus is caused to further perform:

receiving another request, from the device, for the web content associated with the scripting file; and causing, at least in part, rendering of the web content based on the cached session variables.

18. A non-transitory computer-readable storage medium of claim 16, wherein the session variables are local to the device and apply only to the associated web content.

19. A non-transitory computer-readable storage medium of claim 18, wherein the session configuration information applies to multiple domains, and the apparatus is caused to further perform:

specifying the multiple domains in the session variables.

20. A non-transitory computer-readable storage medium of claim 16, wherein the connection is a Hypertext Transfer Protocol (HTTP) Keep-Alive connection, and wherein the identifying of the connection is based on a Transmission Control Protocol (TCP) socket identifier, a worker process identifier, a thread identifier, or a combination thereof corresponding to the HTTP Keep-Alive connection.

* * * * *